United States Patent [19]

Shobert et al.

[11] E Re. 30,770

[45] Reissued Oct. 13, 1981

[54] METHOD FOR FABRICATING IMPROVED FIBER REINFORCED PLASTIC RODS HAVING A SMOOTH SURFACE

[75] Inventors: Samuel M. Shobert, Mishawaka; Elson B. Fish, Lakeville, both of Ind.

[73] Assignee: Plas/Steel Products, Inc., Walkerton, Ind.

[21] Appl. No.: 142,456

[22] Filed: Apr. 21, 1980

Related U.S. Patent Documents

Reissue of:

[64] Patent No.: 4,154,634
Issued: May 15, 1979
Appl. No.: 835,825
Filed: Sep. 22, 1977

[51] Int. Cl.[3] ..... B32B 31/04

[52] U.S. Cl. ..... 156/180; 156/441; 264/137; 264/258

[58] Field of Search ..... 156/180, 441, 181, 166, 156/32, 245; 264/137, 258, 257

[56] References Cited

U.S. PATENT DOCUMENTS

| | | | |
|---|---|---|---|
| 2,684,318 | 7/1954 | Meek | 156/180 |
| 2,694,661 | 11/1954 | Meyer | 156/172 |
| 2,721,599 | 10/1955 | Van De Vanter | 156/441 |
| 2,741,294 | 4/1956 | Pancherz | 156/180 |
| 2,818,606 | 1/1958 | White | 264/258 |
| 2,861,595 | 11/1958 | Pier | 138/30 |
| 2,948,649 | 8/1960 | Pancherz | 156/180 |
| 3,033,729 | 5/1962 | Shobert | 156/149 |
| 3,244,784 | 4/1966 | Boggs | 264/137 |
| 4,100,013 | 7/1978 | Medler et al. | 156/441 |

FOREIGN PATENT DOCUMENTS

| | | |
|---|---|---|
| 908753 | 10/1962 | United Kingdom . |
| 933993 | 8/1963 | United Kingdom . |

*Primary Examiner*—Michael W. Ball
*Attorney, Agent, or Firm*—Gust, Irish, Jeffers & Hoffman

[57] ABSTRACT

This invention relates to a method and apparatus for fabricating continuously a solified elongated rod or hollow shapes of various geometric cross sections of fiber reinforced plastic having a smooth surface. A plurality of strand-like fibers are wetted with a liquid, heat-hardenable plastic, the fibers are collected together into a plastic-wetted bundle, the bundle is continuously, in intermittent steps, passed through an elongated die, the die being heated in sequential zones of progressively increasing temperature so as to harden the plastic by the time the bundle emerges in rod form from the die. The bundle is moved through the die intermittently, dwelling for a predetermined time at rest, then moved an incremental distance, permitted to dwell again, until the hardened bundle eventually emerges from the die. The various heated zones of the die serve to initiate and carry the hardening of the plastic to a predetermined point at which the bundle is moved and the cycle is repeated. In the first zone, the bundle is preheated to a point just short of the plastic becoming hardened such that upon movement to the next succeeding zone, which usually is at a higher temperature, the plastic is cured to a hardened stage.

17 Claims, 7 Drawing Figures

FIG.4
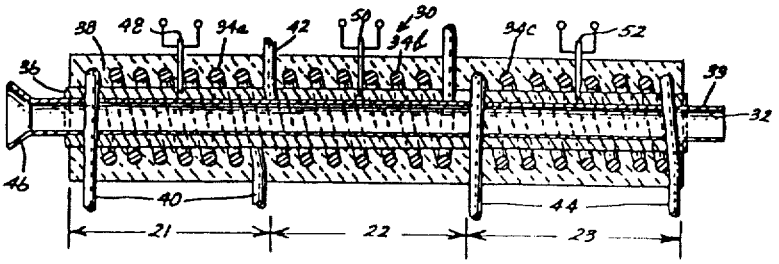
FIG.6
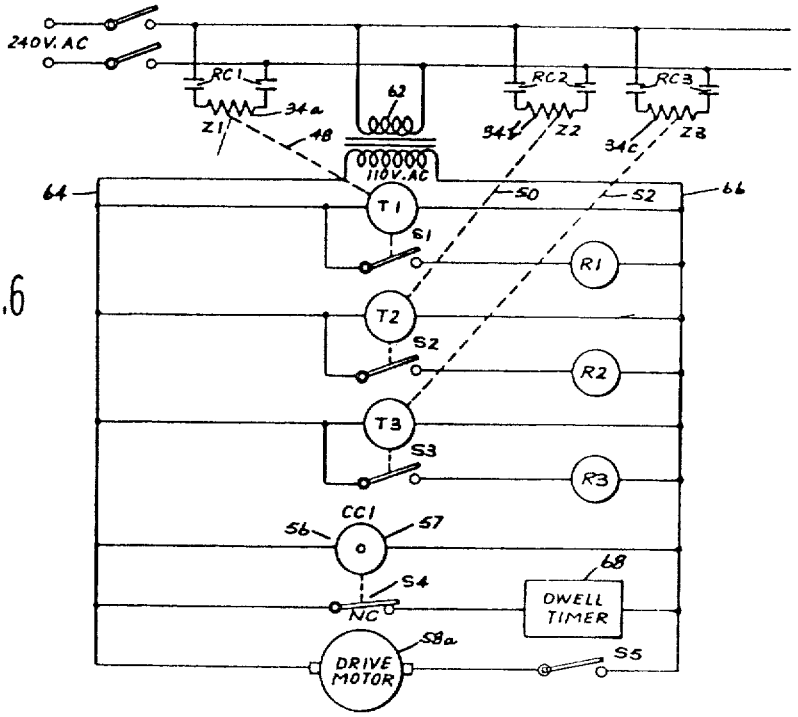
FIG.5a
FIG.5b
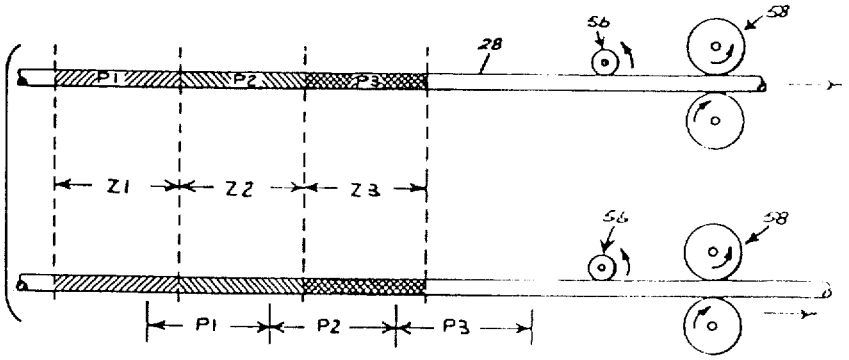

METHOD FOR FABRICATING IMPROVED FIBER REINFORCED PLASTIC RODS HAVING A SMOOTH SURFACE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the method and apparatus for fabricating a fiber reinforced plastic bundle or rod and more particularly to such a bundle or rod having a substantially smooth surface and improved physical properties.

2. Description of the Prior Art

Meek U.S. Pat. No. 2,684,318 discloses a method for fabricating plastic rods reinforced with glass fiber by the pultrusion method whereby a plurality of strands of glass fiber are collected together in a bundle, the strands and bundle passed through a bath of liquid resin, then through a forming die from which it emerges and passes through an elongated heating chamber which serves to substantially harden the resin. The process is one of continuous movement of the bundle and the cured rod is cut into lengths as needed. Upon emerging from the forming die, the bundle is exposed to the atmosphere, there being no force applied to the exterior of the bundle to hold it to size and shape. As a consequence, the natural resiliency of the fibers causes them to project from the bundle surface and further for the bundle itself to expand slightly in cross section. While in the heating chamber, heat energy is conveyed to the bundle by convection until the plastic is cured to hardened condition. The cured rod while solid has a rough, textured surface which must be ground smooth if the rod is to be used for such purposes as fishing poles, golf shafts, strain cables and the like.

Such a bundle if wetted with polyester resin has the property that if drawn through a sizing die which is itself heated, the resin tends to stick to the die surface and further to cure in such a manner that upon emergence from the die the surface is rough and of flaky appearance. In order to overcome the problem in the form of the rough surface, various different resin systems and release agents have been experimented with without apparent success. Further, the rod or bundle has been preheated inside the die to near gel temperature and the rod then allowed to cure outside the die, this also not being successful.

Other prior efforts to produce such fiber reinforced rods by the use of die elements are disclosed in U.S. Pat. Nos. 2,741,294, 2,816,595, 2,948,649, 3,244,784 and 2,818,606.

SUMMARY OF THE INVENTION

The method of the present invention comprehends the continuous but intermittent fabrication of a solidified elongated bundle or rod of fiber reinforced plastic having a degree of smoothness, without additional machining, not heretofore achievable. This method includes the steps of wetting a plurality of strand-like fibers, such as glass roving, with a liquid plastic, collecting the wetted fibers into a bundle which is passed through an elongated, selectively heated die, the bundle substantially filling the die. Heat energy from the die imparted to the bundle serves to harden the plastic. More particularly, this method comprehends the fabricating of a solidified bundle of fiber reinforced plastic according to the steps of wetting a plurality of strand-like fibers with a liquid heat-hardenable liquid plastic, collecting the fibers to a plastic wetted bundle and unidirectionally intermittently pulling said bundle through an elongated die device, said die device being filled with said bundle. The die device is heated to different temperatures in discrete sequential zones, respectively, with zones in the downstream direction being of increasing temperatures. The zones are of predetermined lengths. The pulling of the bundle through the die device is interrupted after a predetermined length increment of bundle has passed from the die device. Between pulling movements, the bundle is permitted to stay at rest within the die for a predetermined dwell time during which the plastic is being elevated in temperature. The bundle is alternately at rest and moving a distance as mentioned previously, but more specifically, the length increment of bundle movement within the die, in one working embodiment, is made less than the length of one of said heated die zones. The temperatures of the respective zones and the aforesaid dwell time are such that the plastic is pre-heated but not hardened in the first upstream zone but does harden in a successive zone. By reason of the natural shrinkage of the plastic during hardening, the bundle size is reduced such that it tends to release from the wall of the die device thereby reducing the force required to pull the bundle from the die device.

Apparatus for fabricating such products according to the foregoing method comprise means for supporting a multiplicity of packages of fiberous strands, such as spools of glass roving. Means are provided for guiding and moving said strands along predetermined paths, at least a portion of these paths including the passing of said strands through a vessel containing liquid, heat-hardenable plastic. Means are provided for collecting the strands into a compacted bundle and a die is provided for hardening the plastic in the bundle, the die slidably receiving the bundle therethrough and being heated for the purpose. More specifically, the die is selectively heated to different temperatures in different zone portions, the lowest temperature zone being in the upstream position.

It is an object of this invention to provide a method and apparatus of continuously fabricating a solidified elongated bundle of fiber reinforced plastic in such a manner that the hardened bundle will have a substantially smooth appearance.

It is another object of this invention to provide a method and apparatus of fabricating a solidified elongated bundle of fiber reinforced plastic in which the finished product not only has a smooth surface but possesses improved properties as compared with rods made by prior art methods and apparatuses.

It is yet another object of this invention to provide a method and apparatus by which the fabrication of such solidified fiber reinforced rods is rendered more efficient, less costly and more reliable than prior art methods and apparatuses.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 4 is a longitudinal section of the die device of this invention used in curing the plastic contained in the bundle;

FIGS. 5A and 5B are diagrams used in explaining the details of this invention; and FIG. 6 is a circuit diagram of the electrical energizing and controlling portions of the apparatus of the preceding figures.

DESCRIPTION OF THE PREFERRED EMBODIMENT

Figure 1:
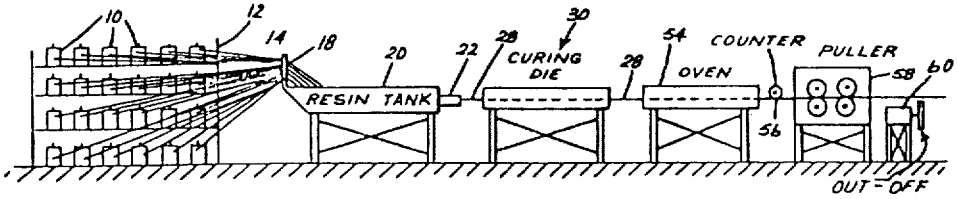
FIG. 1 is a side elevation in diagrammatic form of an apparatus for practicing this invention.
Figure 2:
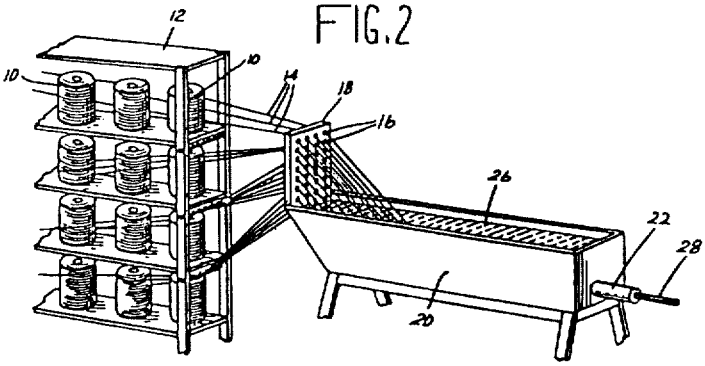
FIG. 2 is a perspective of a portion thereof.
Figure 3:
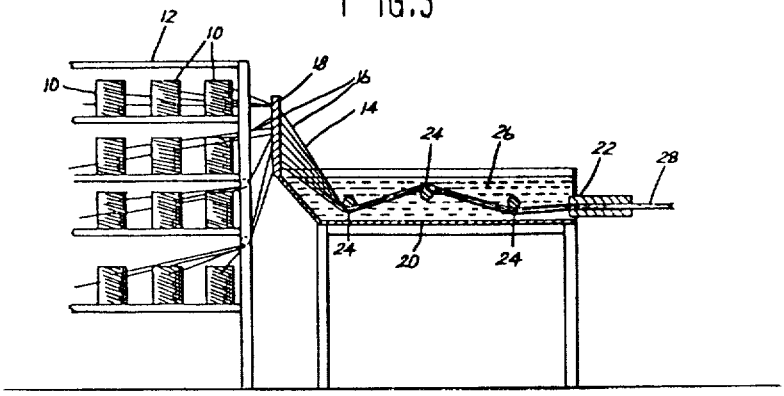
FIG. 3 is a side view partially sectioned showing one typical arrangement for feeding glass roving through a tank of liquid resin and forming the strands into a shaped bundle.

Referring to the drawings, the fiber reinforcement used may be of a variety of different materials, such as fibers of glass, graphite, boron coated carbon, and the like. Such fibers as glass are commonly used in the fabrication of fishing rods, golf shafts, bearings, boats, automobile bodies and the like.

While it is to be understood that various of these fibers may be used in practicing this invention, the specific embodiment herein disclosed will be particularly directed to the use of glass fibers as explained in detail in Shobert U.S. Pat. No. 3,692,607. Referring to the drawings, "cakes" of glass "ends" or roving are identified by the numeral 10, there being a plurality of these "cakes" supported by a suitable creel 12. The rovings are wound in a helix in these "cakes" and may be payed therefrom by merely being withdrawn. As shown in FIG. 1, a plurality of these "cakes" 10 have the roving or strands 14 drawn therefrom and passed through companion apertures 16 in a flat guide plate 18, this plate 18 being mounted on the rear end of a suitable elongated vessel 20 having an aperture gathering die 22 in the distal end thereof. Transverse of the vessel or tank 20 are a series of fixedly mounted, smooth, horizontal steel rods 24 which are kept continuously submerged in liquid resin or plastic maintained at the level as indicated by reference numeral 26.

The apertures 16 and the distribution plate 18 are spaced apart both horizontally and vertically as shown. The strands 14 after being passed through the apertures 16 are guided under and over the respective transverse bars 24 as shown and are also passed through the aperture of the gathering die 22. Alternatively, the strands may be passed through gathering dies of progressively smaller size as clearly disclosed in Meek U.S. Pat. No. 2,684,318. Just enough strands 14 are used such that the bundle of strands as indicated by the numeral 28 which emerges from the die 22 is thoroughly impregnated with resin without any air pockets or voids therein. If too much glass, or in other words too many strands, are passed through the die 22, the resulting bundle will be starved for resin, whereupon it will draw in air and thereby create voids or fractures in the finished product. Weaknesses result in the locations of the voids and fractures and is thus to be avoided if at all possible. If this condition should develop, one solution to the problem is to reduce the total number of strands until the condition disappears. If too few strands are used, an excess of resin will be entrained in the bundle, and resin will drop therefrom. Thus, the ratio of strands to resin, or in other words glass to resin, should be between these two extremes. In instances in which substantial strength is desired in the finished product, the maximum amount of glass in a given size bundle is desired.

As is more clearly shown, as the individual strands 14 enter the bath 16, they are not in contact with any other strands. Thus, these strands become fairly wetted with resin before they arrive at the first transverse guide bar 24. Upon arriving at this bar 24, the strands will be transversely spaced to a degree corresponding to the horizontal spacing of the apertures 16 in the distribution plate 18, these strands which are vertically aligned by reason of the vertical arrangement of the apertures 16 becoming bunched together. Thus, before the strands are bunched together, they are first wetted with the resin 26. This resin may be of the conventional polyester type which hardens upon curing. Curing by heating is conventional in the art. In the form of the wetting bath shown in the drawings, the strands 14 are passed over and under bars 24 as shown prior to being gathered together and collected by the die 22. Thus, the strands become thoroughly wetted by passing through the resin 26 prior to the time they are assembled into bundle 28. The aperture in gathering die 22 is round, in the disclosed embodiment, such that the shape of the bundle 28 as it emerges from the die is cylindrical. Other die shapes may be used. The spacing between die 22 and die device 30 is sufficient to prevent heat transfer back to the tank 20.

Mounted opposite the distal end of the tank 20 in coaxial, horizontal alignment with the die 22 is an elongated die device, hereafter "die," 30 having a die passage or opening 32 of uniform diameter from end to end which registers with the die 22. The surface of the die passage 32 has a high polish so as to provide a minimum of resistance to the passage of the bundle 28 therethrough as well as a smooth finish on the final product. The die 30 is preferably formed as an assembly wherein the die passage 32 is contained within an elongated tubular die element 33 of steel disposed internally of an electrical heating assembly in the form of heating coils 34a, 34b and 34c arranged sequentially from end to end of the die as shown.

The heating coils 34a, 34b and 34c are helically coaxially disposed around the die tube 33 and as shown are of substantially equal length. The coils in one embodiment are formed of conventional high resistance wire of nichrome or the like, the three coils being of the same diameter, turns and size. Further, the coils encircle in closely spaced relation a metal shim tube 36 which slidably receives the die tube 33, suitable thermal insulation 38 housing the tube 36 and the coils 34a, 34b, 34c thereby providing an integrated, unitary die 30. The incasement 38, in one embodiment, is formed of glass roving helically wrapped around the tube 36 to provide some radial spacing between the turns of the coils 34 and the tube 36, and after installation of the coils thereabout for a thickness which adequately covers and protects all the coils. Thus, the incasement 38 is formed substantially of tightly wound glass roving which in the first instance is capable of withstanding the high temperatures generated in the die 30 and secondly, can provide some thermal insulation against excessive loss of heat.

The coils 34a, 34b and 34c being of equal length and design may be considered as dividing the die 30 and more particularly the die tube 33 into three different heating zones Z1, Z2 and Z3 which are of equal length. Each of the coils have leads 40, 42 and 44 extending therefrom by means of which electric power may be supplied thereto.

As shown in FIG. 4, the entrance or upstream end of the die tube 33 has an outward flare 46 to facilitate the entry and movement of a bundle of resin impregnated rovings through the die tube 33. Conventional thermocouples 48, 50 and 52 are buried respectively into the glass fiber casing 38 and into die tube 36 to positions which will sense the temperature of the die tube 33 midway between the ends of the three zones Z1, Z2 and Z3, respectively.

Briefly, the die device 30 is made long enough and is heated to a sufficient extent that as the bundle 28 emerges from the distal end of the die tube 33 (otherwise referred as the downstream end), the resin is hardened. As it emerges, the bundle or rod has a substantially smooth surface which results in the elimination of the conventional operations of grinding or wrapping with cellophane or Mylar to provide a smooth surface.

Disposed downstream of the die device 30 and in longitudinal alignment therewith is final-heating oven 54 of tubular shape containing suitable elements (not shown) which heat the air internally thereof. The bundle 28 in passing therethrough is thus subjected to heated atmosphere inside the oven 54 to effect final heat treatment or hardening as may be desired.

Still downstream of the oven 54 is disposed a counting or lineal-measuring device 56 in the form of a wheel engaged with the cured bundle 28 which is caused to rotate and measure the lineal distance of rod 28 formed during the process. The purpose of the counting device 56 will be explained in further detail later on.

Downstream of the counting device 56 is a pulling mechanism 58 composed of opposed drive wheels as shown which grip the cured rod 28 therebetween to draw the same through the apparatus as may be desired. Such pulling mechanism may be of conventional design or the same as shown in prior U.S. Pat. No. 3,244,784. Any suitable pulling mechanism may be used without departing from the spirit and scope of this invention.

Lastly, as a major item in the total apparatus, is a rod-cutting device 60 mounted downstream of the pulling mechanism 58 which is operable periodically to cut off lengths of the cured rod as may be desired. Such cutoff mechanisms 60 is conventional in the art.

The operation of the apparatus thus far described will now be explained in general detail and in greater detail later. The die device 30 is heated selectively in the zones Z1, Z2 and Z3 by means of the respective heating coils such that generally speaking the bundle as it emerges from the resin tank 20 is preheated in the zone Z1, is cured or hardened in zone Z2, and further treated in zone Z3. The temperatures of these respective zones, depending upon the bundle sizes and resin systems used, progressively increase in temperature from zone to zone in a downstream direction such that the lowest temperature zone is Z1.

The pulling mechanism 58 is operated intermittently such as to pull an incremental length of bundle through the die device 30, cease the pulling action thereby to permit the bundle to lie at rest within the die 30 and thereby be subjected to the heating effects thereof, and then to pull another incremental length of bundle, again stop and so on continuously. Thus, the bundle is alternately being moved and at rest, the rest periods being for a predetermined time interval and the bundle length increments corresponding to the length of zones Z1, Z2 and Z3.

More specifically, with respect to the length increments pulled, generally it is desired that these be slightly less than the corresponding length of each zone Z1, Z2 and Z3. For example, in one operating embodiment of this invention, the zone length is 16 inches for a bundle diameter of 0.312 inches a pull increment of 14 inches. Thus, for a given cycle of operation, each time the pulling mechanism 58 is activated, it pulls 14 inches of bundle from the die 30. Thus a 14 inch segment of a bundle preheated in zone Z1 is moved to zone Z2, a 14 inch segment in zone Z2 is moved to zone Z3 and finally a 14 inch segment within the zone Z3 is moved from the die 30.

This relationship between the length of pull increment and each zone is illustrated in FIGS. 5A and 5B wherein the lengths of the bundle 28 within the zones are indicated by the symbols P1, P2 and P3, respectively, as shown in FIG. 5A, and the length portions thereof which are moved to the next succeeding zones being shown in FIG. 5B, it being clear that something less than the entire length of each segment P1, P2 and P3 is drawn into the next heating zone Z2 and Z3. This will be further discussed later on.

The "at rest" period of the bundle within the die 30 may be referred to as dwell time, this dwell time being carefully selected to obtain the desired end results. This dwell time will vary for different size rods and resin systems as will appear from the chart of parameters hereafter presented. Generally speaking, however, the dwell time is such that the resin does not harden within the zone Z1, but is preheated to a point near the conversion from a liquid condition to hardening, only a relative small increment of additional time and temperature being required for the purpose of causing the resin to convert to hardened condition. As mentioned previously, in the usual instance the zones Z1 and Z2 are at different temperatures, with the zone Z2 being higher. Thus for the next increment of pull, the preheated portion of the bundle 28 in the zone Z1 is pulled into the zone Z2 where it is subjected to a higher temperature for the same dwell time. This higher temperature causes the resin to convert through the various phases of plasticity until it becomes hard. The zone Z3 is for the purpose of further treating the rod hardened in zone Z2 and to assure that the resin is cured.

The rod that emerges from the die 30 has a degree of surface smoothness corresponding to that of the interior of the die tube 33. Thus, if the die tube 33 is provided with a die surface that is highly polished, the emerging cured bundle will have a degree of smoothness corresponding thereto. This is a highly desired result because it eliminates the usual, conventional processing steps of grinding a hardened rod for the purpose of smoothing the surface or alternatively wrapping a partially cured rod with a molding tape of cellophane or Mylar. These extra finishing steps obviously add to the cost of manufacturing, and as will be explained in the following, can result in the production of a product inferior to that achievable by practicing the present invention. By proper balancing of the various parameters involved in the method and apparatus of this invention, a very smooth, resin rich surface is obtained in the finished rod which for the usual purposes of end use require no further finishing. The fabricating parameters, product quality and other features of advantage will be discussed in more detail later in connection with explaining the significant contribution which this invention makes to the art.

Referring now to FIG. 6, a circuit diagram illustrative of the electrical operating and controlling portions of the apparatus is shown. The coils 34A, 34B and 34C are respectively connected across the lines of a source of electrical power as shown, with normally closed relay contacts RC1, RC2 and RC3 beng in series with the coil leads, respectively. A dropping transformer 62 has its primary connected across the same power lines and the secondary thereof connected to supply leads 64 and 66 as shown. Conventional thermostats T1, T2 and T3 are connected across the supply lines 64 and 66 as shown and each have a switch S1, S2 and S3 also connected across the supply lines 64 and 66 but in series with the coils of relay switches R1, R2 and R3, respectively. The thermocouples 48, 50 and 52 of FIG. 4 are connected to the respective thermostats T1, T2 and T3 as indicated by dashed lines, and the relay coils R1, R2 and R3 operate the respective switch contacts RC1, RC2 and RC3.

In operation, the temperatures of the various zones Z1, Z2 and Z3 are independently maintained substantially constant by means of the thermostat circuitry. A description of the operation of one of the zones, for example zone Z1, will suffice for all. Assuming that the die 30 is to be heated to operating temperatures from ambient, connection of the main power source results in energization of the various zones by reason of the fact that the relay contacts RC1, RC2 and RC3 are normally closed. When the temperature of the zone reaches its predetermined limit, the thermocouple 48, for example, senses this and couples a corresponding signal to thermostat T1. Thermostat T1 responds and closes its switch S1 which now connects the coil of relay R1 across supply line 64 and 66. Energization of relay R1 opens switch contacts RC1. When the temperature of zone Z1 cools down below a predetermined limit, the thermocouple 48 senses this activating the thermostat T1 causing the switch S1 to open. The coil of relay R1 is deenergized thereby permitting normally closed contacts RC1 to close. Power is once again applied to the coil 34a to cause it to heat back to temperature.

These thermostatic controls are conventional and should hold the temperatures of the various zones to within one to two degrees Fahrenheit.

Further connected across supply lines 64 and 66 is the electrical portion of counting device 56 which measures the lineal increment of rod drawn from the die device 30 as explained previously. This device 56 includes a wheel 57 that peripherally engages the cured bundle such that lineal movement of the bundle results in rotation of the wheel 57. This rotation is measured by conventional counter circuitry included in the device 56 to operate a normally closed switch S4. Switch S4 is connected in series with a conventional dwell timer 68 which controls the operation of another single-pole single-throw switch S5. Timer 68 is of the type and design that will adjustably provide a count of from a few seconds, such as ten, up to two to three minutes. This is only exemplary of a working embodiment of this invention, the actual timing cycle depending upon the many variables involved as will be explained in more detail later.

The switch S5 is connected in series with the electric motor 58a that drives the pulling mechanism 58, the motor 58a and switch S5 being connected across the lines 64 and 66.

In operation, this control mechanism functions to pull out a measured length of rod from the die 30, stop the pulling mechanism 58 for a predetermined period of time until the hardening cycle is completed as previously explained and once again activate the pulling mechanism 58 to pull another length increment of bundle from the die device 30. Assuming that the pulling mechanism 58 has just been deactivated thereby to start the curing cycle, for this condition the switch S5 will have been opened by the dwell timer 68 and the counting device 56 will have closed switch S4 to reset timer 68. The resetting function desirably causes the timer 68 to open switch S5. After the timer 68 counts for a predetermined period of time, such as 30 seconds, it closes switch S5 thereby energizing drive motor 58a. The pulling mechanism 58 thereby pulls bundle through the die device 30 causing the wheel 57 of the counting device 56 to rotate. When a predetermined number of rotations of the wheel 57 have occurred, the related counting device 56 opens switch S4 thereby deenergizing or resetting timer 68. This results in timer 68 opening switch S5 thereby to stop the drive motor 58a. The counting device 56 as well as the timer 68 are so arranged that the switch S4 upon being opened will a delayed instant later again close following the opening of switch S5 to reset timer 68 to start once again the timing cycle. Thus, the control circuitry thus described determines the length of bundle intermittently pulled through the die 30 and furthermore the time which the bundle remains within the die device 30, this time being carefully selected to provide the desired rate and extent of resin cure.

For the purpose of further explaining working features of this invention, in the following is presented a chart indicating fabricating parameters for rods of various diameter and glass content and heating zones sixteen inches long.

| Rod Size (In.) | Die Zone Temperatures °F. Z1 | Z2 | Z3 | Dwell Time (Seconds) | Stepped Bundle Length, Inches | tion Rate Inches/ Minutes | Number of Strands | Resin Specifications |
|---|---|---|---|---|---|---|---|---|
| .125 | 305 | 340 | 340 | 30 | 10.7 | 15.0 | 4.25 | A |
| .187 | 240 | 320 | 320 | 30 | 11.0 | 15.6 | 10 | B |
| .312 | 170 | 265 | 280 | 40 | 14.0 | 15.3 | 28 | B |
| .375 | 190 | 260 | 280 | 39 | 13.0 | 14.5 | 41 | B |
| .400 | 195 | 260 | 275 | 42 | 14.0 | 14.4 | 47 | B |
| .508 | 170 | 250 | 250 | 45 | 13.0 | 13.1 | 78 | C |
| .625 | 180 | 230 | 240 | 65 | 12.0 | 8.9 | 114 | C |
| .758 | 185 | 230 | 250 | 75 | 12.6 | 8.3 | 165 | C |
| .875 | 170 | 210 | 215 | 96 | 13.0 | 6.8 | 220 | C |
| 1.00 | 190 | 190 | 230 | 120 | 13.0 | 5.8 | 287 | C |

-continued

| Rod Size (In.) | Die Zone Temperatures °F. Z1 | Z2 | Z3 | Dwell Time (Seconds) | Stepped Bundle Length, Inches | tion Rate Inches/ Minutes | Number of Strands | Resin Specifi-cations |
|---|---|---|---|---|---|---|---|---|
| .508 HH | 185 | 250 | 250 | 60 | 13.5 | 10.8 | 65 | D |

Generally speaking, it will be noted that the temperature of zone Z1 is less than that for the other zones Z2 and Z3. In practice, it has been learned that by the time the bundle emerges from the zone Z2 and enters zone Z3, the resin therein has hardened. Thus, the zone Z3 is for the purpose of further heat treating the hardened rod and assuring that the rod is fully cured. The temperature of zone Z3 is generally slightly greater than that of zone Z2.

The dwell times for various rod sizes generally increase with increasing rod sizes and the pull increments vary some with rod size but generally are about the same. The number of glass strands varies dramatically for the different rod sizes, the larger the rod size the greater the number of strands, and different resin specifications also apply to rods of some different sizes. Common to all of the parameters is the stage heating of the bundle in the die 30 wherein the upstream zone is normally of lower temperature than the next succeeding zone, the pull increment is preferably less than zone length by a desired amount and the resin is fully cured to a smooth finish by the time it emerges from the die 30.

The strands in the chart are of glass fiber roving. Owens Corning, Type K426, 225 yield (yards per pound) Pittsburg Plate Glass Company, Type 713NT, 225 yield (yards per pound).

In the chart, the resin specifications are denoted by the letters A, B, C and D. Generally speaking, the resins A and B are for the smaller diameter rods while the resins C and D the larger. The resins A and B may be characterized as high reactivity resin and resins C and D as low reactivity resins. Both types of resin serve in achieving a quality end product at relatively fast cure times. A resin system is selected that will provide a good quality rod, have the longest possible pot life and further will yield the highest possible rate of production. For the larger diameter rods, a resin system is used with relatively low exothermic reaction to reduce the rate of heat generation internally of the rod thereby to avoid internal cracks and fractures. Since the resin and glass are relatively good thermalinsulators, and the resin generates heat during cure which needs to escape from the bundle interior, it necessarily follows that if the internal exothermic heat is generated too rapidly, it cannot dissipate quickly enough to avoid localized thermal expansion of the bundle causing uneven stresses which produce fractures or cracks. Thus it is necessary to balance the rate of resin cure with the other fabricating parameters in order to avoid the development of these internal fractures.

Again referring to the resin, an excess amount of styrene provides a viscosity which is too low, while too little styrene provides a viscosity which is too high. Outside of these two extremes, the glass fiber roving will not become properly wetted as it passes through the resin in the tank 20. For best results, a viscosity of 290 to 320 CPS is desirable, using a Zahn #5 cup at 72° F.

As will appear from the following specific resin descriptions, a dual catalyst system is used to lower the gelling temperature of the resin for the purpose of minimizing the possibility of the development of internal heat fractures.

RESIN "A" FORMULATION

Polyester resin as manufactured by Silmar Division of Vistron Corporation. 12355 S. Van Ness Avenue, Hawthorne, Calif., and sold under the trademark S-685M.

Specific gravity—1.11

Viscosity Brookfield—1400 cps. avg.

Catalyst of

Benzoyl Peroxide and Dicyclohexyl Phthalate in the ratio of 85% and 15%, respectively.

In form of fine white granules having a bulk density of 31 lbs./ft.$^3$.

Soluble in common organic solvents, monomers such as styrene and methyl methacrylate and unsaturated polyester resins.

Sold under the trademark CADOX BFF-85 by NOURY Chemical Corp., Burt, N.Y.

Monomer—Styrene

Catalyst—Bis(4-t-Butylcyclohexyl) Peroxydicarbonate in white powder form, having a bulk density of 29 lbs/ft.$^3$. It is soluble in water, slightly soluble in alchol, soluble in acetone, esters and very soluble in aromatic and chlorinated hydrocarbons.

Sold by Noury Chemical Corp. under trademark PERCADOX 16.

Formulation: Mix 8 pounds of styrene and by weight ½% of CADOX BFF-85 catalyst, ½% PERCADOX 16 and ½% of ZELEC UN at about 65° F.-75° F. until all solids are dissolved and then add to 40 pounds of resin and throughly mix.

RESIN "B" FORMULATION

Polyester resin as manufactured by Silmar Division of Vistron Corporation, 12335 S. Van Ness Avenue, Hawthorne, Calif., and solid under the trademark S-685M.

Specific Gravity—1.11

Viscosity Brookfield—1400 cps. avg.

Catalyst of

Benzoyl Peroxide and Dicyclohexyl Phthalate in the ratio of 85% and 15%, respectively.

In form of fine white granules having a bulk denisty of 31 lbs./ft.$^3$.

Soluble in common organic solvents, monomers such as styrene and methyl methacrylate and unsaturated polyester resins.

Sold under the trademark CADOX BFF-85 by NOURY Chemical Corp., Burt, N.Y.

Formulation: Mix 8 pounds of Styrene and by weight 1% of CADOX BFF-85 catalyst, and ½% of ZELEC UN at about 65° F.-75° F. until all solids are dissolved and then add to 40 pounds of resin and throughly mix.

RESIN "C" FORMULATION

Polyester resin as manufactured by Archer Daniels Midland Company, 733 Marquette Avenue, Minneapolis, Minn., and sold under the trademark AROPOL 8110.

Specific gravity—1.15 a v
Monomer Styrene—26%±1%
Viscosity 3300-3900 cps at 77° F., Brookfield No. 3 spindle at 12 RPM Catalyst of
Benzoyl Peroxide and Dicyclohexyl Phthalate in the ratio of 85% and 15%, respectively.
In form of fine white granules having a bulk density of 31 lbs./ft.$^3$.
Soluble in common organic solvents, monomers such as styrene and methyl methacrylate and unsaturated polyester resins.
Sold under the trademark CADOX BFF-85 by NOURY Chemical Corp., Burt, N.Y.

Monomer—Styrene

Catalyst—Bis(4-t-Butylcyclohexyl)Peroxydicarbonate in white powder form, having a bulk density of 29 lbs./ft.$^3$. It is insoluble in water, slightly soluble in alcohol, soluble in acetone, esters and very soluble in aromatic and chlorinated hydrocarbons.

Sold by Noury Chemical Corp. under trademark PERCADOX 16.

Formulation: Mix 10# of styrene and by weight ½% of CADOX BFF-85 catalyst, ½% PERCADOX 16 and ½% of SELEC UN at about 65° F.-75° F. until all solids are dissolved and then add to 40# of resin and throughly mix.

RESIN "D" FORMULATION

Polyester resin as manufactured by Koppers Company, Inc., Pittsburgh, Pa., and sold under the trademark Koppers Polyester Resin V7000-15.

Specific Gravity—1.05-1.08
Monomer—Vinyl Toluene
% Monomer—Approx. 40
Viscosity—1300-1700 cps.

Catalyst of
Benzoyl Peroxide and Dicyclohexyl Phthalate in the ratio of 85% and 15%, respectively.
In form of fine white granules having a bulk density of 31 lbs./ft.$^3$.
Soluble in common organic solvents, monomers such as styrene and methyl methacrylate and unsaturated polyester resins.
Sold under the trademark CADOX BFF-85 by NOURY Chemical Corp., Burt, N.Y.

Formulation: Mix 7 pounds of styrene and by weight ½% of CADOX BFF-85 catalyst and ½% of ZELEC UN at about 65° F.-75° F. until all solids are dissolved and then add to 40 pounds of resin and throughly mix.

As will now be appreciated, the various parameters are so selected as to produce a quality product while maximizing rate of production. Within these parameters, certain generalizations may be made as requirements, for example, preheating in one zone and curing (solidifying or hardening) in a succeeding zone, drawing a length of bundle between zones which is desirably shorter than the zone length, and utilizing resin formulations that are compatible therewith. With respect to die temperatures, preheating is performed at a temperature and dwell time which will heat the resin in the bundle to a point short of the resin being solidified and further the resin will not solidify until shortly after being pulled completely into the succeeding die zone following the preheating zone. The resin should be sufficiently liquified as the bundle is moving from the preheating to the curing zone that it will not solidify during the movement into the curing zone, curing or solidification occuring after the bundle segment becomes stationary in the hardening zone. It is desired that the resin solidify shortly after the bundle segment becomes stationary in the curing zone, this resulting in shortening production time.

With the resin still being in a liquid state when it is drawn from the preheating zone into the curing zone, there is little resistance to bundle movement. Further, since the segment of the bundle in the curing zone reduces slightly in cross-section due to shrinkage of the resin upon solidification, minimal force is required to pull the bundle through the die. This results in minimal wear on the die.

For given zone temperatures, the dwell time must be selected such that the desired product quality is obtained for the shortest possible dwell time. The dwell time can be increased beyond this optimum up to a limit as described above without deleteriously affecting quality; however, if the dwell time is made too long, the resin can become excessively polymerized in the preheating stage before it comes to rest in the curing zone. If the dwell time is made too long, or preheating temperature too high, the resin can become solidified in the preheating zone which will result in a portion of the bundle becoming hardened just prior to entering the die. This hardened, entering portion of the bundle would be of a size too large to easily pass through the die which can result in jamming and stopping the operation. If the dwell time is too short, this would result in the resin not being sufficiently preheated so as to be in condition to cure in the second zone. While it could be cured in a succeeding zone, obviously the die would have to be made longer which would require more floor space for the apparatus.

While the precise state of curing in the preheating zone is not known due to the fact that the resin cannot be analyzed while in the die 30, the foregoing explanation of the resin condition at the time of "pull in" into the curing stage must be theorized. However, the quality of the finished product can be examined for the purpose, and should the quality appear unsuitable, adjustment of the parameters may be altered until proper quality is achieved.

The finished rod itself may be examined for the purpose of determining whether or not the parameters have been properly selected. If not properly selected, the rod emerging from the die 30 may not be fully cured, internal fractures may appear or a resin buildup may occur in the die which will produce surface imperfections in the form of scratches and gouges. When properly set, the rod will be fully hardened, there will be no fractures nor resin buildup in the die and the surface of the rod will be glossy smooth as determined by the degree of polish on the die surface.

It is desirable that the liquid resin in the tank 20 be maintained at a relatively low temperature of between 65° F. to 75° F. thereby to maintain pot life and also to provide a substantially uniform temperature of the resin as it enters the preheating stage. In view of the fact that bundle segments shorter than the zone length are stepped through the die, this results in a short preheated portion of the bundle remaining in the preheating zone.

Should this remaining portion solidify before the next pulling step, this will not result in degradation of the product, since upon solidification, the resin will shrink thereby reducing cross-sectional bundle size permitting ease of movement of the bundle through the die. Further, the additional curing time and heating to which this remaining portion may be subjected in the curing zone does not degrade quality but merely serves to further insure that the resin has been fully cured before the bundle emerges from the die. By reason of the fact that the die zones are contiguous, there will obviously be some temperature gradient therebetween, but by reason of a proper selection of the processing parameters, the desired end product is achieved.

The die tube 33 is conventional DOM (drawn over mandrel) steel tubing which is conventionally produced. Such tubing is quite inexpensive as compared to other specially bored dies and furthermore has a long life due to the minimal attrition of the bundle with the die surface as previously explained. Other materials and configurations may be used so long as the die surface is smooth and uniform.

With respect to the finished product, relatively close tolerances, such as plus or minus 1/1000 to 2/1000 of an inch can be obtained. The product is resin rich at the surface which contributes to the glossy smooth finish and further serves to protect the glass fibers since none of them are exposed at the surface. Furthermore, all of the fibrous material entrained in the bundle as it enters the die is contained in the finished product which is in contrast with prior art products made according to the process of Meek U.S. Pat. No. 2,684,318 wherein the product had a roughened surface with exposed fibers that had to be ground off in order to provide a smooth surface.

The product may be made with a greater glass to resin ratio, such as 70% to 72% glass by weight than products made by prior art methods which contributes toward an increase of modulus of elasticity, flexural and tortional strengths.

Another property of this product resides in the lower degree of porosity, a density of, for example, about 0.073 pounds per cubic inch being obtainable as compared with 0.069 pounds per cubic inch for a product made according to prior art processes.

As will be noted in the resin formulations above described, a separating agent known as Zelec UN produced and sold by E. I. du Pont de Nemours & Company, Inc., is mixed with the polyester resin. This separating agent is thoroughly mixed with the polyester resin and has the property of providing non-adherence of the resin bundle 28 with the surface of the die tube 33. With the bundle 38 thoroughly impregnated with this liquid resin mixture, it is known and theorized that upon being heated, the separating agent migrates to the surface of the bundle 28 where it interfaces between the surface 32 of the die and the exterior of the bundle 28. The separating agent has a property of providing release between the surface 32 such that the bundle does not tend to adhere but instead smoothly separates therefrom. This combined with the bundle shrinkage upon hardening results in minimal force being required to pull the bundle through the die.

The Zeluc UN (a trademark of E. I. du Pont de Nemours & Company, Inc.) separating agent specifically disclosed herein is chemically of the type of an alcohol phosphate-unneutralized. It has the following physical properties:

Ionic Type—Anionic
Active Ingredient Content—100%
Physical Appearance—Pale Yellow Liquid
Odor—Mild, Fatty Alcohol
pH, 1.0% of Deionized Water 77° F. (25° C.)—2.3
Specific Gravity 25°/25° C.—0.983
Lb./Gal., 77° F. (25° C.)—8.2
Flash Point—320° F. (160° C.)
Decomposition Temperature—>350° F. (177° C.)
Viscosity, csp. Brookfield
80° F. (27° C.)—165
100° F. (38° C.)—85

Solubility: It tends to be greater in nonpolar solvents, is self-dispersible in both water and glycerol, mixable with kerosene and is soluble in carbon tetrachloride, isopropanol, styrene and toluene.

While this particular separating agent is specified, any other separating agent may be used so long as it provides for the smooth release between the bundle and the die surface during the hardening of the plastic. For certain processing parameters and resin formulations, use of a separating agent may not be required, thus a separating agent may not be used in all instances.

While specific parameters have been given, it will be understood by persons skilled in the art that these can be varied, for example to obtain different rod sizes or hollow shapes with various cross-sectional configurations, without departing from the spirit and scope of this invention. These parameters can be varied, utilizing the step of preheating, so long as the quality of product is achieved and preferably rate of production is maximized.

While there have been described above the principles of this invention in connection with specific apparatus, it is to be clearly understood that this description is made only by way of example and not as a limitation to the scope of the invention.

What is claimed is:

1. The method of fabricating a solidified bundle of fiber reinforced plastic comprising the steps of wetting a plurality of strand-like fibers with a liquid heat-hardenable plastic, collecting said fibers into a plastic wetted bundle and unidirectionally intermittently pulling said bundle through a continuous elongated tubular die device, said die device being filled with said bundle, subjecting a length portion of said bundle in said die device to a predetermined pre-heating temperature for a given period of time which temperature and time conjointly are insufficient to solidify said plastic but which are conducive to solidification, pulling said length portion in which said plastic has not solidified to a successive [portion] *position* in said die device for a distance substantially equal to the length of said length portion and then stopping, said plastic which has not solidified during such pre-hearing to said predetermined temperature being sufficiently liquid as not to solidify during bundle movement, then subjecting that portion of the length of said length portion in which the plastic has not solidified to further enhanced heating at a higher predetermined temperature for another given period of time sufficient to solidify said plastic, solidification occuring during said enhanced heating at said higher predetermined temperature and while said bundle is stationary, said bundle remaining substantially in contact with said die device while residing therein except for shrinkage of the plastic and said die being [unoperable] *unopenable.*

2. The method of claim 1 wherein said plastic is polyester resin and the temperature of said further heating is higher than said pre-heating temperature, the pre-heating temperature and time being sufficient to raise the resin to near but short of being solidified.

3. The method of fabricating a solidified bundle of fiber reinforced plastic comprising the steps of wetting a plurality of strand-like fibers with a liquid heat-hardenable plastic, collecting said fibers into a plastic wetted bundle and unidirectionally intermittently pulling said bundle through a continuous elongated tubular die device, said die device being filled with and directly engaged by said bundle, heating said die device to different temperatures in discrete sequential zones, respectively, with the zones in the downstream direction being of increasing temperatures, said zones being of predetermined lengths, interrupting the pulling of said bundle after a predetermined length increment of said bundle has passed from said die device for a predetermined dwell time whereby said bundle is alternately at rest and moving a distance of said predetermined length, at least a portion of said length increment being moved from one of said zones to the next succeeding downstream zone during movement of said bundle for said predetermined length, the length of said predetermined length increment, the temperatures of the respective zones and said dwell time being such that said plastic in the moved predetermined length increment is pre-heated but does not fully solidify in the first upstream zone but does solidify in a successive zone such that the plastic is sufficiently liquid that it will not solidify during bundle movement, solidification occurring while the bundle is stationary, and further the plastic in the bundle which emerges from the die device being fully solidified, the surface of the emerging bundle is of a smoothness corresponding to the smoothness of the die device, the size and shape of the emerging bundle is substantially the same as the size and shape of the die device except for shrinkage of the plastic occurring as a result of solidification, said plastic shrinking during solidification thereby reducing the bundle size and the force required to pull said bundle through said die device, said bundle remaining substantially in contact with the die device while the bundle resides therein except for shrinkage of the plastic and said die being [unoperable] *unopenable.*

4. The method of claim [1] *3* in which said plastic is polyester resin.

5. The method of claim [1] *3* wherein said plastic is a polyester resin and said zones are adjoining, there being two such zones, the upstream zone serving to pre-heat the bundle and the adjoining downstream zone solidifying the same, said die device being electrically heated, and separately controlling the temperatures of said zones.

6. The method of claim [1] *3* in which said fibers include glass.

7. The method of claim [1] *3* in which said zones are adjoining, said pulling action being repetitively intermittent such that solidified bundle emerges from said die device in a continuum of intermittent steps, the temperatures of said zones being controlled such that the solidified bundle emerging from said die device contains no internal fractures.

8. The method of claim [1] *3* wherein the length of said increment is shorter than the length of the first upstream zone by an amount corresponding to a length of said increment being about fourteen inches and the length of said first zone being about sixteen inches.

9. The method of claim [1] *3* wherein the length of said increment is shorter by about thirteen percent or more than the length of the first upstream zone.

10. The method of claim [1] *3* wherein the first two adjacent upstream zones have a temperature differential in the range of from about 35° F. to about 80° F. for bundle cross-sections varying from about 0.125 inch to about 1.000 inch.

11. The method of claim 10 wherein said dwell time is within the range of from about thirty seconds to one hundred twenty seconds.

12. The method of claim 11 wherein said bundle increment is within the range of from about ten inches *to* fourteen inches.

13. The method of claim 12 wherein three adjacent upstream zones have temperatures ranging from lowest, to intermediate, to highest within a differential of from about 35° F. to about 80° F. between the lowest and highest.

*14. The method of fabricating a solidified bundle of fibrous strands in a body of resinous material comprising the steps of:*

*(a) impregnating all of a plurality of fibrous strands with a liquid heat-hardenable resin,*

*(b) collecting all of said impregnated strands into a resin wetted bundle and unidirectionally intermittently pulling said bundle through an elongated closed hollow die device thereby providing alternate pulling and dwell, said die device being filled with said bundle during pulling and said bundle being fully impregnated prior to entry into said die device, said intermittent pulling being in substantially equal length increments, said dwell being for substantially equal time increments,*

*(c) heating said bundle while within said die device to solidify said resin, said pulling, heating and dwell of said bundle being so controlled that*

*(i) resin in the bundle which emerges from the die device is fully solidified and the resin in the bundle at the point of entry into the die device is not solidified,*

*(ii) the surface of the emerging bundle corresponds to the polish of the surface of said die device,*

*(iii) is substantially devoid of imperfections due to resin build-up within said die device, and*

*(iv) the emerging bundle is devoid of internal fractures.*

*15. The method of claim 14 wherein said resin is polyester.*

*16. The method of claim 14 wherein said strands include fibers of glass.*

*17. The method of claim 14 wherein said die device is of metal, said bundle being directly engageable with the die surface of said die device.*

* * * * *

UNITED STATES PATENT AND TRADEMARK OFFICE

CERTIFICATE OF CORRECTION

PATENT NO. : Reissue 30,770

DATED : October 13, 1981

INVENTOR(S) : Samuel M. Shobert, Elson B. Fish

It is certified that error appears in the above—identified patent and that said Letters Patent is hereby corrected as shown below:

In the Abstract, line 2, "solified" should be --solidified--.

Column 7, line 11, "beng" should be --being--.

Column 8, line 55, "tion" should be --Production--.

Column 14, line 55, "pre-hearing" should be --pre-heating--.

Signed and Sealed this

*Ninth* Day of *March 1982*

[SEAL]

*Attest:*

GERALD J. MOSSINGHOFF

*Attesting Officer*

*Commissioner of Patents and Trademarks*